United States Patent
Tammela et al.

(10) Patent No.: US 11,175,509 B2
(45) Date of Patent: Nov. 16, 2021

(54) TUNED WAVEGUIDES

(71) Applicant: Microsoft Technology Licensing, LLC, Redmond, WA (US)

(72) Inventors: Simo Kaarlo Tammela, Espoo (FI); Ari Juhani Tervonen, Vantaa (FI); Heikki Juhana Hyvarinen, Grankulla (FI); Lasse Pekka Karvonen, Espoo (FI); Andreas Langner, Espoo (FI); Pietari Tuomisto, Helsinki (FI)

(73) Assignee: Microsoft Technology Licensing, LLC, Redmond, WA (US)

(*) Notice: Subject to any disclaimer, the term of this patent is extended or adjusted under 35 U.S.C. 154(b) by 17 days.

(21) Appl. No.: 16/587,479

(22) Filed: Sep. 30, 2019

(65) Prior Publication Data
US 2021/0096371 A1 Apr. 1, 2021

(51) Int. Cl.
 *G02B 27/00* (2006.01)
 *G02B 27/01* (2006.01)
 *G02B 27/42* (2006.01)

(52) U.S. Cl.
 CPC ..... *G02B 27/0172* (2013.01); *G02B 27/0081* (2013.01); *G02B 27/4205* (2013.01); *G02B 2027/0123* (2013.01)

(58) Field of Classification Search
 None
 See application file for complete search history.

(56) References Cited

U.S. PATENT DOCUMENTS

| | | | |
|---|---|---|---|
| 2005/0070027 A1* | 3/2005 | Gollier | G01N 21/7743 436/518 |
| 2006/0228073 A1* | 10/2006 | Mukawa | G02B 17/0856 385/31 |
| 2014/0240842 A1* | 8/2014 | Nguyen | G02B 6/0076 359/630 |
| 2015/0205126 A1* | 7/2015 | Schowengerdt | G06T 7/73 345/633 |
| 2015/0235088 A1* | 8/2015 | Abovitz | A63F 13/213 345/633 |
| 2016/0085300 A1* | 3/2016 | Robbins | G02B 27/0093 345/633 |
| 2016/0209657 A1* | 7/2016 | Popovich | A61B 3/113 |
| 2017/0059759 A1* | 3/2017 | Ayres | G02B 5/1857 |
| 2017/0160548 A1* | 6/2017 | Woltman | G03B 21/204 |
| 2017/0235142 A1* | 8/2017 | Wall | G02B 5/26 359/633 |

(Continued)

OTHER PUBLICATIONS

"International Search Report and Written Opinion Issued in PCT Application No. PCT/US20/037988", dated Sep. 11, 2020, 11 Pages.

*Primary Examiner* — Martin Mushambo
(74) *Attorney, Agent, or Firm* — Rainier Patents, P.S.

(57) ABSTRACT

The description relate to devices, such as augmented reality and/or virtual reality devices that employ optical waveguides. On example includes a first optical waveguide configured to receive light at an incidence angle and a second optical waveguide positioned in a non-parallel relation to the first optical waveguide. The second optical waveguide can be configured to receive the light through the first optical waveguide at a first location at the incidence angle, transmit the light within the second optical waveguide, and output the light from a second location back toward the first optical waveguide at the incidence angle.

20 Claims, 8 Drawing Sheets

(56) References Cited

U.S. PATENT DOCUMENTS

| | | | |
|---|---|---|---|
| 2017/0242249 A1* | 8/2017 | Wall | G02B 6/0016 |
| 2017/0285348 A1* | 10/2017 | Ayres | G02B 5/18 |
| 2017/0299860 A1* | 10/2017 | Wall | G02B 6/003 |
| 2017/0307886 A1* | 10/2017 | Stenberg | G02B 5/1814 |
| 2017/0315356 A1* | 11/2017 | Tervo | G02B 27/4205 |
| 2017/0329137 A1* | 11/2017 | Tervo | G02B 6/0026 |
| 2018/0284440 A1* | 10/2018 | Popovich | G02B 27/0172 |
| 2018/0364486 A1* | 12/2018 | Ding | G02B 6/0026 |
| 2018/0373035 A1* | 12/2018 | Yee | G02B 27/017 |
| 2018/0373115 A1* | 12/2018 | Brown | G02B 5/1814 |
| 2019/0187482 A1* | 6/2019 | Lanman | G06F 3/011 |
| 2019/0310482 A1* | 10/2019 | Schultz | G02B 6/0026 |
| 2019/0317270 A1* | 10/2019 | Tammela | G02B 6/005 |
| 2020/0064633 A1* | 2/2020 | Maimone | G06F 3/013 |

* cited by examiner

TUNED WAVEGUIDES

BACKGROUND

Display technology is advancing in the areas of augmented reality (AR) and virtual reality (VR) to provide users with more immersive visual experiences. For example, in some AR applications, generated imagery can be displayed to a user via a transparent display that also allows the user to view the surrounding physical environment. The generated imagery enhances or augments the user's experience or knowledge of the surrounding physical environment.

In some devices an optical waveguide can be used to spatially translate a generated image from one position to another position in an optical system. For example, in a near-eye display (NED) device, an optical waveguide made of a substrate can spatially translate propagating light waves representing imagery generated by a light engine and convey them along an optical path toward one or both eyes of a user. Such technology may be incorporated into an NED device in the form of eyeglasses, goggles, a helmet, a visor, or some other type of head-mounted display (HMD) device or eyewear.

However, conforming to the physical space and shape constraints of many of these NED devices tends to cause degradation of images translated by the optical waveguides. The present concepts address these and other issues.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

This patent relates to display technology that can be employed in virtual reality (VR) devices and/or augmented reality (AR) devices, among others. Some of these devices are spatially constrained in a dimension extending along the user's line of sight (e.g., near eye devices (NEDs)). Such devices do not have room for traditional optics for generating and focusing images on the user's eyes. Further, the optics would block the user's vision. Instead, transparent optical waveguides can be used to spatially translate light from one position on an AR/VR device to another position on the AR/VR device. Stated another way, transparent optical waveguides can allow images to be generated outside of the user's line of sight and translated into the line of sight.

Two general device configurations can be employed. In the first configuration, light is received from one side of the transparent optical waveguides and emitted from the other (e.g., periscope configuration). In the second configuration, light is received and emitted from the same side (e.g., mirror configuration). In the mirror configuration, light is received from one side of a device, moved laterally, and emitted from that same side, but in the opposite direction. The mirror configuration lends itself to the shape and dimensions of many devices, such as glasses and goggles, among others. However, the mirror configuration can introduce optical issues that are described below.

Some devices can employ a single optical waveguide to translate all of the light of the image. Other configurations can employ multiple optical waveguides (e.g. a waveguide stack or waveguide assembly). For instance, specific wavelength ranges can be handled by individual optical waveguides. As noted above, mirror configurations can offer architectural and/or dimensional advantages over periscope configurations. However, employing multiple optical waveguides in a mirror configuration tends to cause degradation of the resultant image that is collectively generated from light transmitted through the different optical waveguides. The present concepts can tune parameters of the waveguide assembly to reduce/eliminate this degradation and thereby emit higher quality images to the user's eyes while still satisfying the physical device constraints.

Figure 1A:
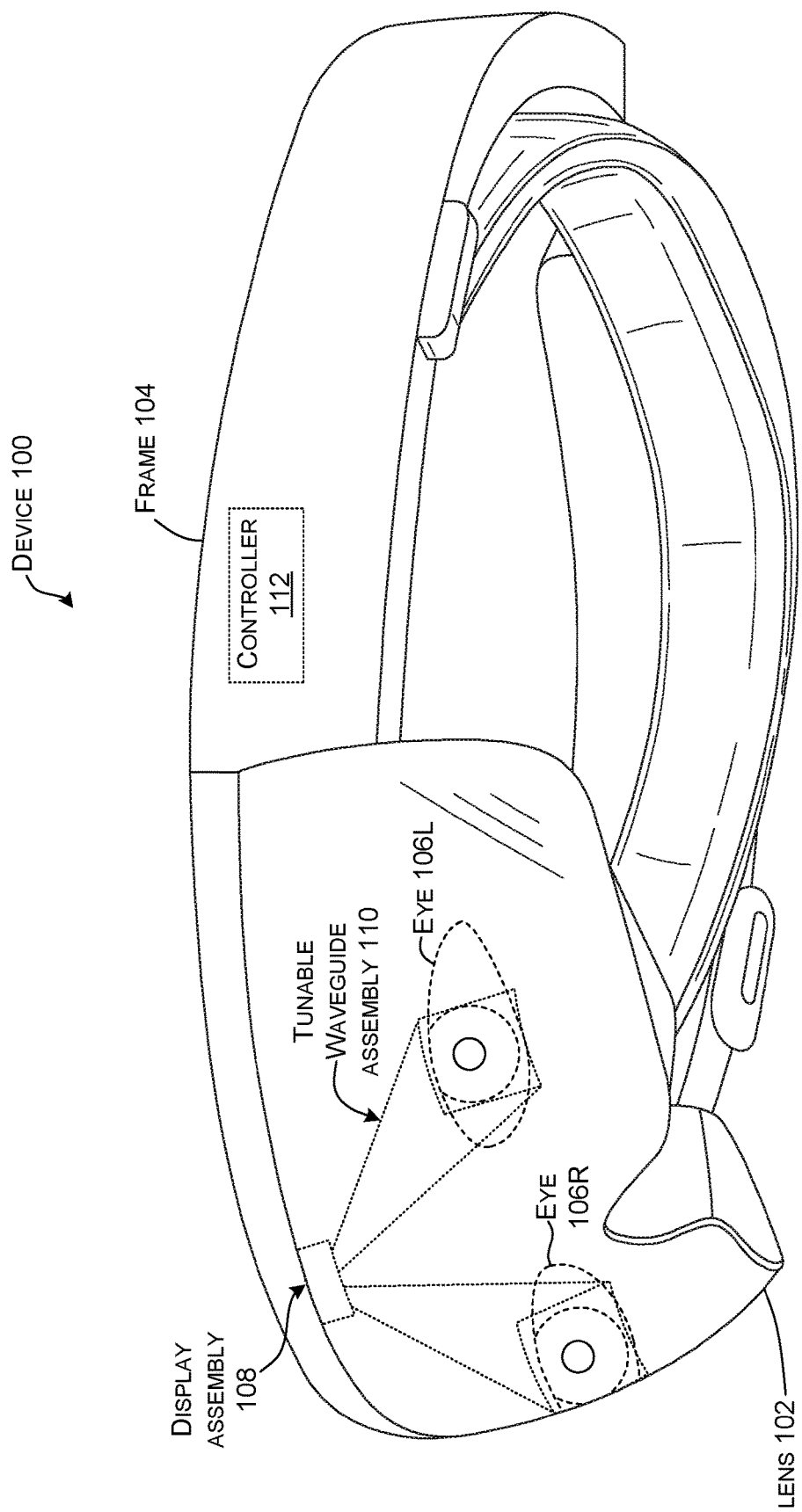
FIG. 1A shows an example device that can include tunable waveguide assemblies in accordance with some implementations of the present concepts.
Figure 1B:
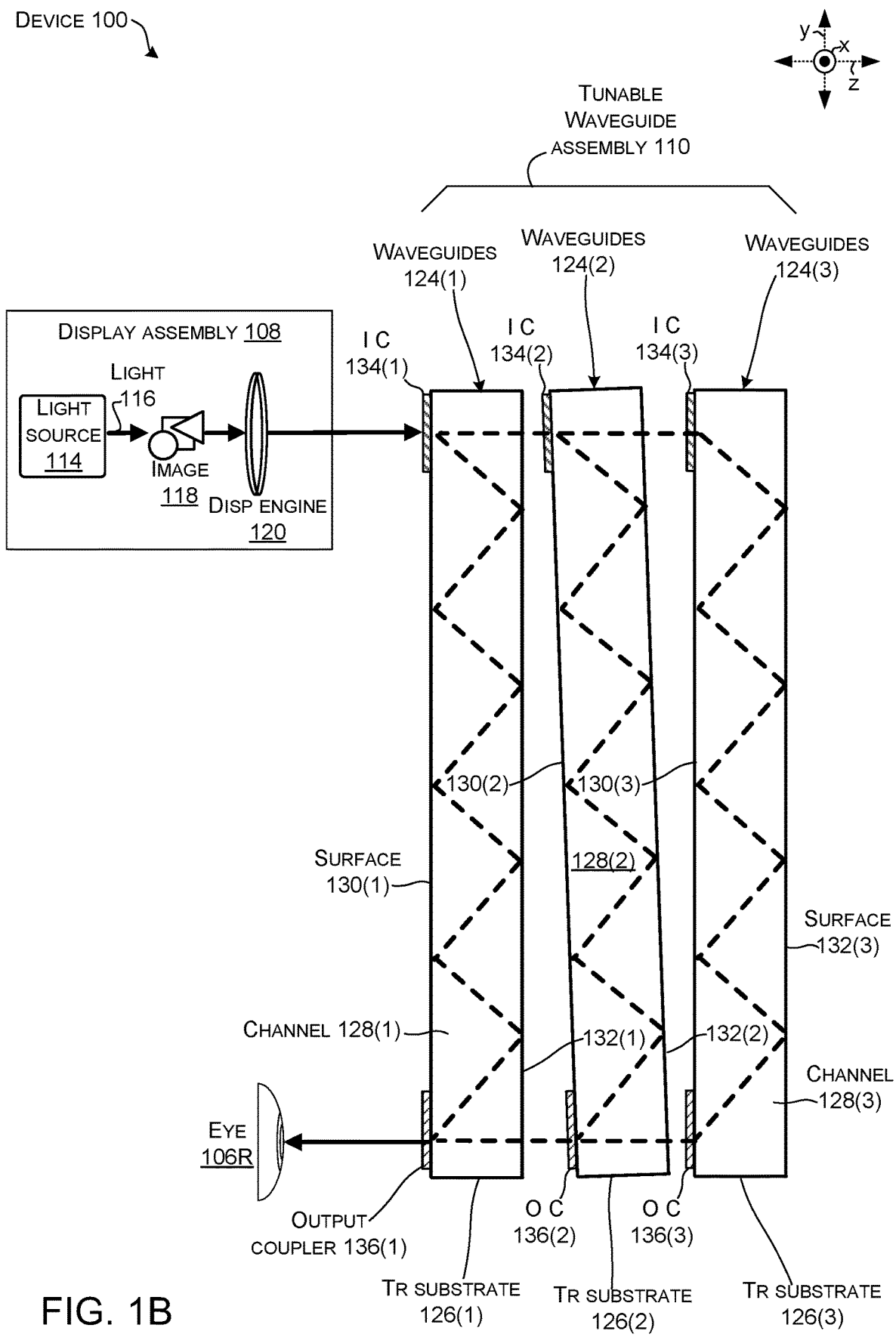
FIGS. 1B, 2A, 2B, 3A, and 3B show sectional views of example devices that can include tunable waveguide assemblies in accordance with some implementations of the present concepts.

FIGS. 1A and 1B collectively show an example device 100 that can employ some of the present concepts. The device 100 can include a protective visor or lens 102 that can be secured to a frame 104. In this case, the frame 104 can be worn on the head of a user to position the lens 102 in front of the user's eyes 106. The device 100 can also include a display assembly 108, a tunable waveguide assembly 110, and a controller 112 (each of which is shown in ghost in FIG. 1A to indicate that they would not generally be visible). In this case, the display assembly 108 can be positioned outside a line of sight of the user, such as in the frame 104. However, the location of the display assembly 108 is provided for purposes of explanation. It is contemplated that the display assembly could be positioned at other locations.

In some cases, the lens 102 can be manifest as two lenses and the tunable waveguide assembly 110 can be positioned between, and protected by, the two lenses. The tunable waveguide assembly 110 can extend from the display assembly 108 into the user's line of sight (e.g., in front of the user's eyes). The controller 112 can cause the display assembly 108 to generate light (e.g., images). The light can be conveyed from the display assembly 108 to the tunable waveguide assembly 110. The tunable waveguide assembly 110 can convey the light from the display assembly 108 along the lens 102 and emit the light in front of the user's eyes (e.g., in the user's line of sight) for visual sensing by the user. Stated another way, the tunable waveguide assembly 110 can overlay images on the user's view of the surrounding physical environment in an augmented reality scenario. The user can perceive the light as virtual content in combination with light from the environment in an augmented reality implementation.

The device 100 may include various other components such as a processing unit, storage/memory, a communication module, and/or a power supply. The storage/memory can be accessible to the processing unit for storing processor readable instructions and data. The communication module can be communicatively coupled to the processing unit and can act as a network interface for connecting the device to another computer system. The processing unit may include one or more processors including a central processing unit (CPU), a graphics processing unit (GPU) and/or holographic processing unit (HPU). Storage/memory can be a computer-readable storage media that may store instructions for execution by the processing unit, to provide various functionality to the device 100. Finally, the power supply can provide power for the components. The device 100 may also include additional components, such as image capture devices (e.g. cameras), audio devices (e.g. microphones and speakers), and/or location/motion capture devices (e.g. accelerometers), among others.

FIG. 1B shows a sectional view of a portion of device 100 relative to the user's right eye 106R. Of course, the description can also be applied to the left eye. As illustrated, the display assembly 108 can include a light source 114 configured to generate light (represented by arrows 116) for an image 118. Various types of light sources 114 can be employed. One example light source can be a light engine that may generate light waves representing images for displaying on device 100. The light engine may be any sort of device capable of emitting light, such as one or more light emitting diodes, or one or more microdisplay imagers, such as liquid crystal on silicon or a liquid crystal display. Display assembly 108 may also include a display engine 120 for consolidating light waves generated by the light source into the image 118. Specifically, the display engine may include a micromechanical system (MEMS)-based scanning system that can "paint" an image based on light waves produced by the light source. Other display assembly configurations are contemplated and can be employed.

As mentioned above, the tunable waveguide assembly 110 can transmit the light 116 laterally (e.g., in the x and/or y-reference directions) and emit the light toward the user's eye so the user perceives the image 118. The tunable waveguide assembly 110 can include multiple transparent optical waveguides (hereinafter, 'waveguides') 124. The illustrated implementation includes three waveguides 124(1), 124(2), and 124(3). An alternative configuration with two waveguides is described below relative to FIGS. 2A-3B. In the illustrated configuration, at least two waveguides are oriented in a non-parallel relationship to one another. In this case, waveguide 124(1) and 124(2) are not oriented parallel to one another. This aspect is described in more detail below.

Individual waveguides 124 can include a transmissive substrate 126, which is manifest as an example transmission channel 128. The transmission channel 128 can be bound by surfaces 130 and 132 that may be substantially parallel to each other and that may be internally reflective so as to provide total internal reflection (TIR) of light (e.g., light waves) 116 propagating within transmissive substrate 126. The waveguides 124 can propagate light over certain internal angles. Light propagating at some non-zero angle of incidence to the surfaces 130 and 132 of the waveguide can travel within the waveguide via the transmissive substrate 126, bouncing back and forth between the surfaces via TIR.

Transmissive substrate 126 can be made of any material or combination of materials with appropriate optical properties to facilitate light propagation by TIR. In some implementations, transmissive substrate 126 can be made of optical-grade glass, for example, formed through an injection molding process. The glass used to form transmissive substrate 126 can, in some implementations, include silicon dioxide (SiO2). Alternatively, in other implementations, transmissive substrate 126 may be formed of a polymer resin.

Individual waveguides 124 may also include input couplers 134 and/or output couplers 136. The input couplers 134 can receive the light waves into the waveguide ("in-coupling") at a first location and the output couplers 136 can output the light waves from the waveguide ("out-coupling") at a second location. The input couplers 134 and/or output couplers 136 can be manifest as optical elements that may function as optical input ports or optical output ports for the light waves. For example, in some implementations, input couplers 134 and/or output couplers 136 can entail diffractive optical elements (DOEs). Such a DOE may be a grating structure such as a surface relief grating (SRG). However, it is to be appreciated that other types of DOEs can be used, such as binary or multilevel relief gratings, volume holograms, resonant waveguide gratings, partially reflective mirrors, etc. Among other functions, input couplers 134 and/or output couplers 136 may serve to laterally expand an exit pupil and/or a field of view (FOV) of the image in the x and/or y-reference directions when comparing the image 118 emitted by the display assembly 108 and the image as displayed for the user's eye 106.

When the input couplers 134 and/or output couplers 136 are manifest as DOEs such as SRGs, they may be formed as part of or proximate to a given surface 130 and/or 132 of transmissive substrate 126. For example, in this implementation, input couplers 134 and/or output couplers 136 can be formed on surfaces 130 of transmissive substrates 126, or may be located immediately proximate to surface 130, such as within one micrometer from the surface, for instance.

In the illustrated configuration, the waveguide assembly 110 can handle a range of wavelengths. For instance, the range may include all visible light wavelengths. In some configurations, a sub-range may be handled by each waveguide 124. For instance, a first sub-range may be handled by waveguide 124(1), a second sub-range may be handled by waveguide 124(2), and a third sub-range may be handled by waveguide 124(3). The sub-ranges may overlap or be exclusive. In one case, the first sub-range can include blue light and the blue light could be transmitted within transmissive substrate 126(1), while the red and green light pass through. The green light could be transmitted by transmissive substrate 126(2), while the red light is passes through to transmissive substrate 126(3). The light can be re-combined to create the image for the user's eye 106.

As mentioned above, waveguides 124(1) and 124(2) are not parallel to one another. This non-parallel nature can be identified because surface 132(1) of waveguide 124(1) is not parallel to surface 130(2) of waveguide 124(2). In this implementation, waveguides 124(2) and 124(3) also are not parallel to one another as reflected by surface 132(3) not being parallel to surface 130(3). The non-parallel waveguides can reduce/eliminate image degradation associated with interference fringes (e.g., air gap interference). However, employing non-parallel waveguides 124 can cause other degradation issues in the resultant image. For instance, the non-parallel orientation of waveguide 124(1) and 124(2) can cause light from these waveguides to be slightly offset. For instance, for a given unit of an image, such as a pixel, light that travels through one waveguide might be slightly offset from light that travels through another waveguide.

This misalignment aspect can be addressed by tuning individual input couplers 134 and/or individual output couplers 136. For instance, output coupler 136(2) can be tuned so that light that is transmitted through transmissive substrate 126(2) and emitted from output coupler 136(2) is parallel to the light received at the input coupler 134(2) (or otherwise aligned with light transmitted by and emitted from waveguide 124(1)). Alternatively or additionally, output coupler 136(3) can tune light emitted from waveguide 124(3) so that the light is received at waveguide 124(1) parallel to the light that was passed through waveguide 124(1) and was received by input coupler 134(3). The tuning aspect is described in more detail below relative to FIGS. 2A-3B.

Figure 2A:
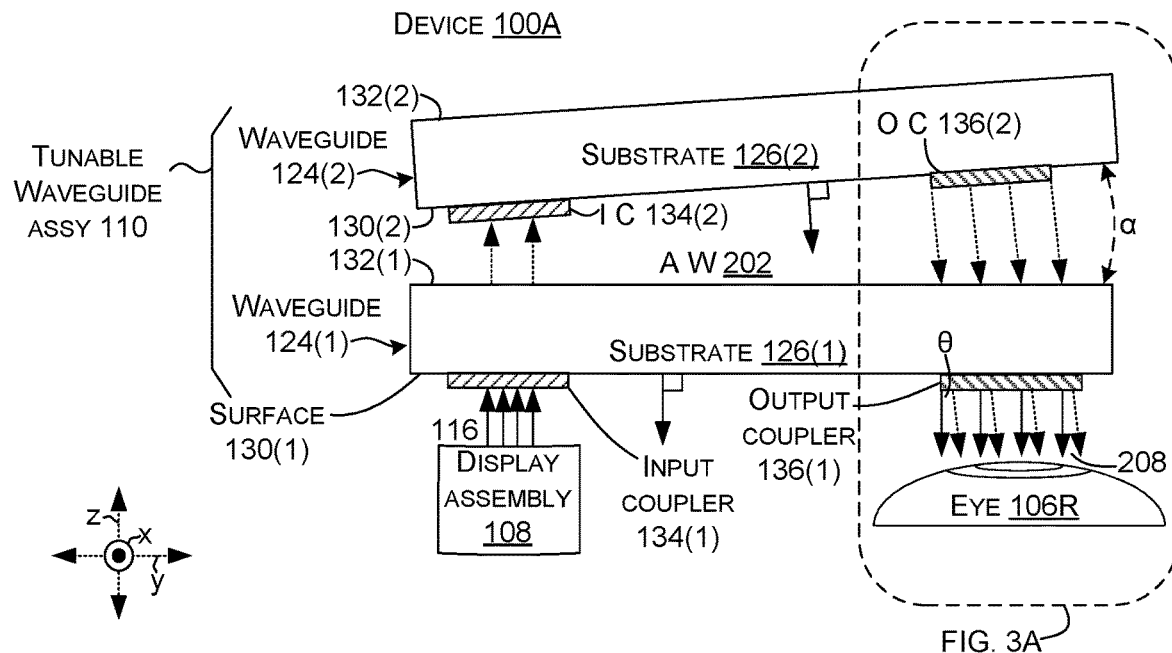
Figure 2B:
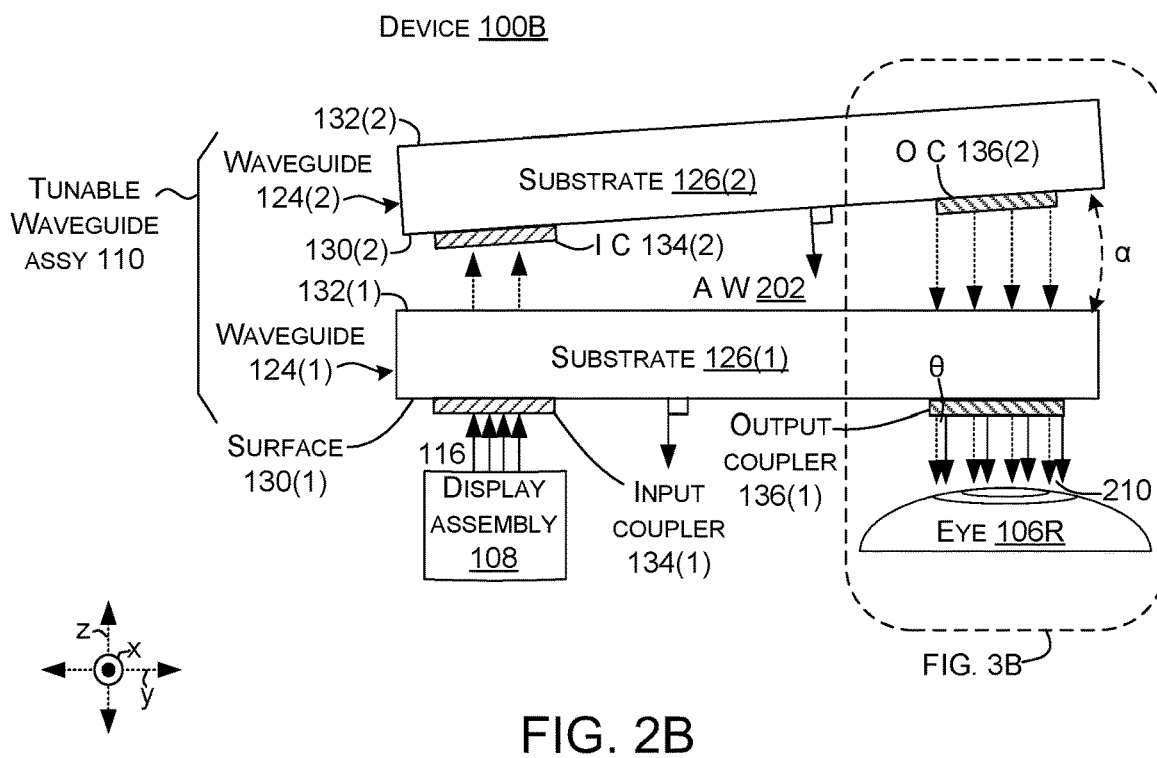
Figure 3A:
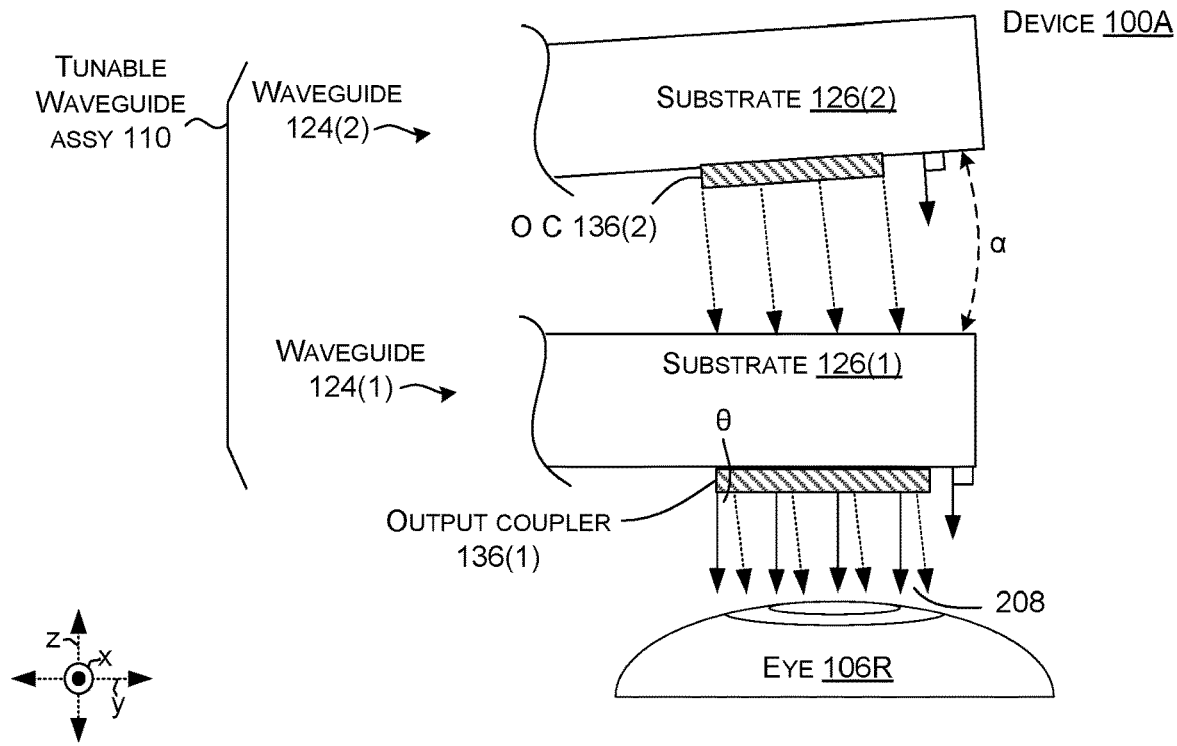
Figure 3B:
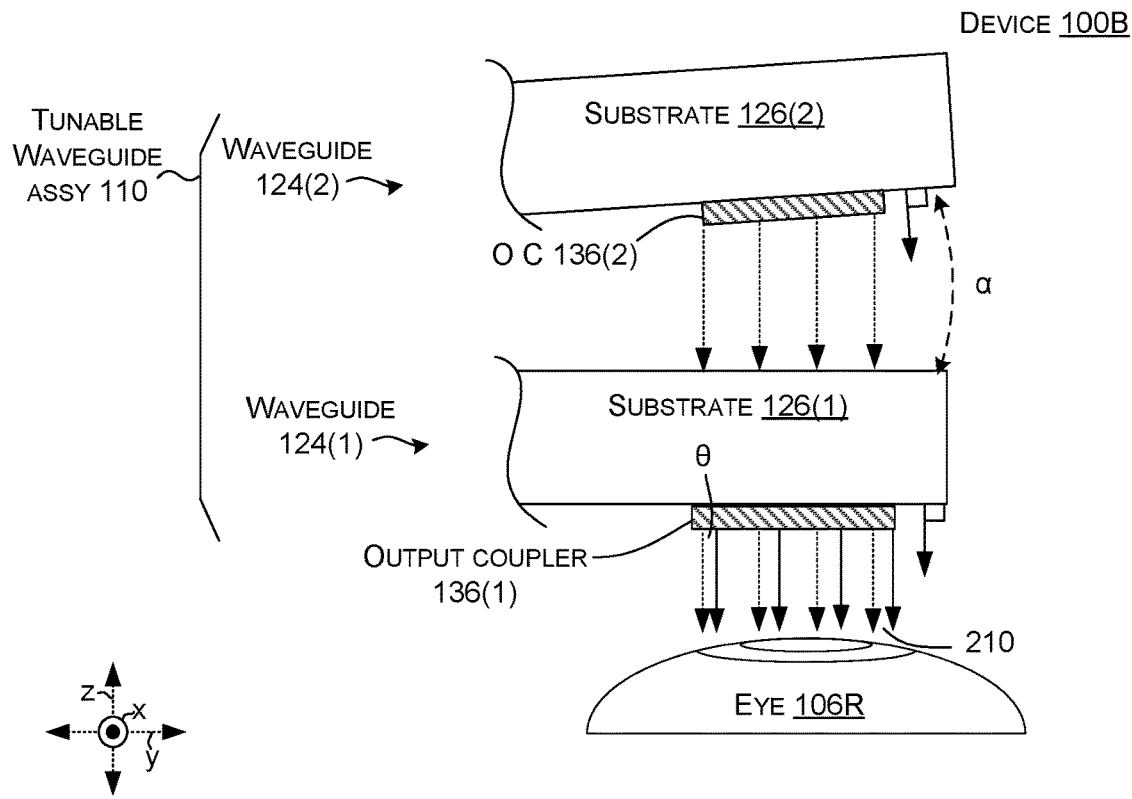

FIGS. 2A, 2B, 3A, and 3B collectively show details relating to tunable waveguide assemblies 110. FIGS. 2A and 3A relate to device 100A and FIGS. 2B and 3B relate to device 100B. (The suffixes 'A' and 'B' are used relative to the devices to indicate that some elements of device 100A and device 100B may be different from those of device 100 of FIGS. 1A and 1B and/or from each other). FIG. 2A shows the tunable waveguide assembly 110 in an untuned configuration and FIG. 2B shows the tunable waveguide assembly 110 in a tuned configuration. FIG. 3A is an enlarged portion of FIG. 2A and FIG. 3B is an enlarged portion of FIG. 2B.

In the illustrated configuration, the tunable waveguide assembly 110 can include multiple waveguides 124. Individual waveguides 124 can include substrate 126, input coupler 134, and/or output coupler 136, among others. Among other functions, input couplers 134 and/or output couplers 136 may serve to laterally expand an exit pupil (e.g., area on substrate through which the image can be observed).

In this case, the first waveguide 124(1) receives the light 116 from the display assembly 108. In this illustrated case, the light is received perpendicular to the first waveguide (e.g., the incidence angle is zero because the light is received normal to the substrate 126(1)). However, the light can be received at other angles and each angle can correspond to a particular pixel in the image FOV. Note, that while the light is received normal to the first waveguide 124(1), the light is not normal (e.g., has a different incidence angle) to the second waveguide 124(2) due to the non-parallel nature of the first and second waveguides 124(1) and 124(2).

In this implementation, waveguide 124(1) can transmit red light and green light and waveguide 124(2) can transmit green light and blue light. The light can be recombined at the user's eye 106R to generate images.

Traditional configurations that employ multiple parallel waveguides cause air gap interference because of reflection from the two surfaces of the airgap between the waveguides. Interference fringes are produced with parallel waveguides where all light beams entering into the eye have exactly the same path distance between the waveguides (e.g., in the air gap). This path issue is especially problematic for wavelengths of light (e.g., green in this example) that are transmitted by multiple waveguides 124.

In the illustrated implementation, waveguides 124(1) and 124(2) can be non-parallel to one another when viewed along the x-reference axis (e.g., in the yz-reference plane) as represented by angle α. The non-parallel nature of the waveguide plates can introduce a refraction wedge, which in this case can be filled with air (e.g., an airgap wedge 202). The non-parallel waveguides 124(1) and 124(2) and the airgap wedge 202 can reduce interference fringes that are produced by multiple parallel waveguides. The transmission efficiency of the illustrated implementation can depend at least in part on the input angle and resultant interference fringes.

Non-parallel waveguides in a periscope configuration cause light beams entering the eye to have different path distances. The different paths cause part of the light beams to be constructively combined and part of the light beams to be de-constructively combined and thereby interreference fringes are mitigated (e.g., cancelled).

However, for non-parallel waveguide mirror configurations, such as the illustrated implementations, rather than mitigating image degradation, the image degradation is exacerbated. In this latter case, the light beams coming from the two non-parallel waveguides are at different angles and the difference is two times (2×) the wedge angle α (e.g., the difference in the chief ray angle between the two non-parallel waveguides). This angular difference associated with the wedge angle can degrade the modulation transfer function (MTF) of the waveguide assembly. Modulation transfer function is a measure of the ability of an optical system to transfer various levels of detail from an object to an image. Performance is measured in terms of contrast (degrees of gray), or of modulation, produced for a perfect source of that detail level. (Definition from https://www.optikos.com/modulation-transfer-function/).

This image degradation due to angular difference is evidenced in FIGS. 2A and 3A, at 208 where green light (in dashed arrows) from waveguide 124(2) has a different orientation (angle θ) than green light (in solid arrows) from waveguide 124(1) at the user's eye 106R. The misalignment of the green light causes the degradation of the image resolution. For example, when the green component of the image is not aligned it is not possible to align the blue and red wavelengths with the green. Stated another way, the image pixels received from the two waveguides are misaligned and thus image quality is degraded.

FIGS. 2B and 3B show an example of how the present concepts can mitigate this image degradation issue by tuning parameters associated with the input couplers 134 and/or output couplers 136. These parameters can include period and/or orientation, of the input and/or output couplers, among others. Tuning the parameters can mitigate the airgap wedge (e.g., align the chief ray angle (CRA) of the two non-parallel waveguides 124). In such a case, the two non-parallel waveguides can function as an ideal mirror when the sum of the grating vectors (in coupling, pupil multiplication, and out coupling) equals zero.

Stated another way, introducing airgap wedge 202 between two waveguide 124 causes a small change in the incidence angle θ (difference between light ray and normal) into waveguide 124(2). If the device is in the periscope configuration, then angle in=angle out (e.g., for the case where the sum of the grating vectors being zero), and this doesn't cause any problems in the image formation at the user's eye 106. But in the illustrated mirror configuration, the difference in the input light angle causes double the difference in the output angle. See FIG. 3A where there is an angular difference 8 between green light coming from waveguide 124(2) (e.g., dotted arrows) and green light coming from waveguide 124(1) (e.g., solid arrows). Therefore, in the case of the airgap wedge 202 and non-parallel waveguides 124, the present implementations can compensate for this angular difference as seen in FIG. 3B.

As mentioned above, in the illustrated configuration, green light is especially susceptible to this degradation because it travels through both waveguides 124(1) and 124(2). The green image component can be compensated to ensure that the green light coming through the different waveguides reaches the user's eye from the same direction. If there's a small directional difference it causes decrement in MTF and the green image isn't sharp. Note that other implementations may split up the wavelength range differently than the illustrated configuration (e.g., other colors of light may be handled by two or more waveguides).

One technique for tuning the input couplers 134 and/or output couplers 136 relates to grating vectors for the tunable waveguide assembly 110. In this case, the tuning can be performed on input coupler 134(2) and/or output coupler 136(2). Recall that the input coupler 134(2) and/or output coupler 136(2) can function as diffractive optical elements or DOEs. The grating vectors (grating orientations & periods) for the DOEs can be solved utilizing the basic assumption that the input angle=output angle. In case of employing the airgap wedge 202 the new input angle is angle α. The desired "new" output angle is known (e.g., the angle that matches the output angle of light transmitted through waveguide 124(1)). The unchanged input coupler 134(2) and expansion gratings (grating vectors) can provide a solution for the new slightly modified grating vector for the input coupler 134(2) and/or output coupler 136(2) by using the grating equation.

Stated another way, a tuning solution for the misalignment problem is to match the sum of the in-coupling, expansion and out-coupling grating vectors with the misalignment caused by the airgap wedge 202 instead of having the sum of the grating vectors equal to zero.

Thus, the airgap wedge 202 between waveguides 124(1) and 124(2) mitigates the interference fringes, but introduces misalignment issues. Recall that the input coupler 134(2) and the output coupler 136(2) can function as diffraction gratings. The grating vector sum adjustment can be applied to the diffraction gratings to correct the misaligned image components. The configuration of this diffraction grating can be specified based upon the grating vector sum adjustment.

In the untuned configuration of FIGS. 2A and 3A, light is emitted from output coupler 136(2) normal to waveguide 124(2). This light then misaligns with light from waveguide 124(1) which is emitted from output coupler 136(1) normal to waveguide 124(1). This misalignment is evidenced at 208 in FIGS. 2A and 3A. In the tuned configuration of FIGS. 2B and 3B the correction performed by output coupler 136(2) causes the light emitted from it to be parallel to light transmitted by waveguide 124(1) and output by output coupler 136(1) as evidenced at 210. Stated another way, in this example, the tuning can cause the light from waveguide 124(2) to be normal to waveguide 124(1) so that the light from both waveguides is aligned. Recall that in the illustrated example, the light is received from the display assembly 108 normal to the first waveguide 124(1), but the correction shown relative to FIGS. 2B and 3B can reduce misalignment at other incidence angles.

Figure 4A:
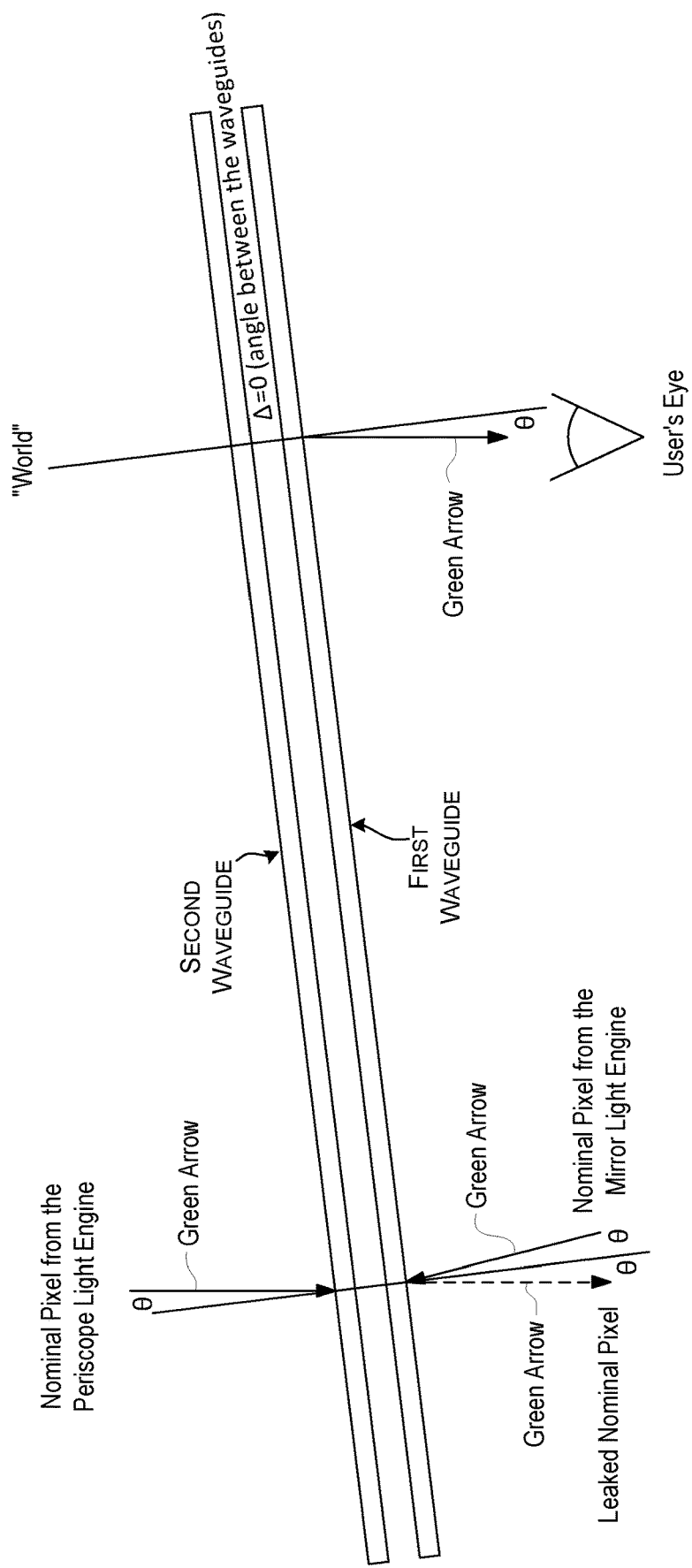
FIGS. 4A-4D show graphs relating to example waveguide correction techniques in accordance with some implementations of the present concepts.
Figure 4B:
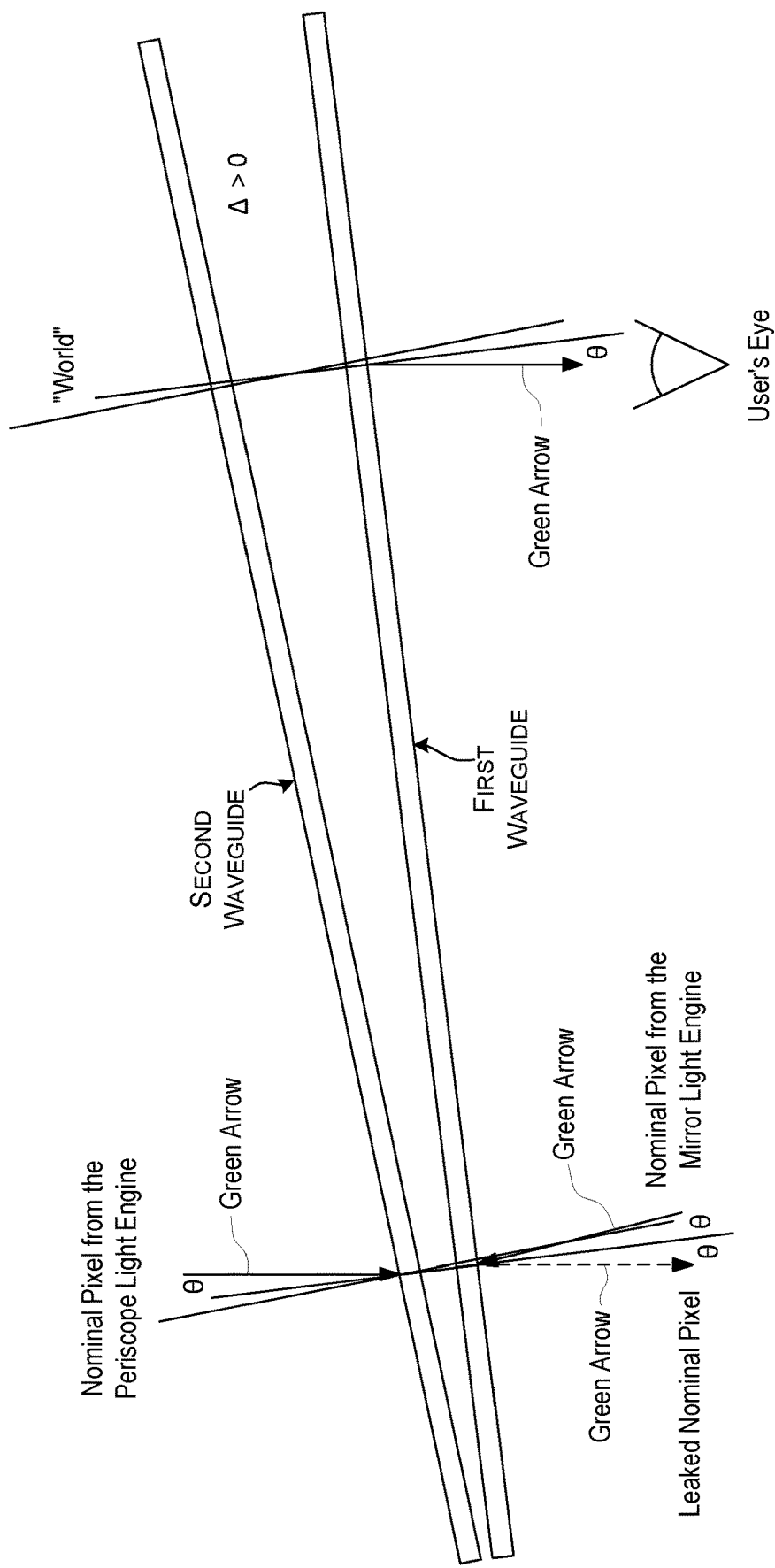
Figure 4C:
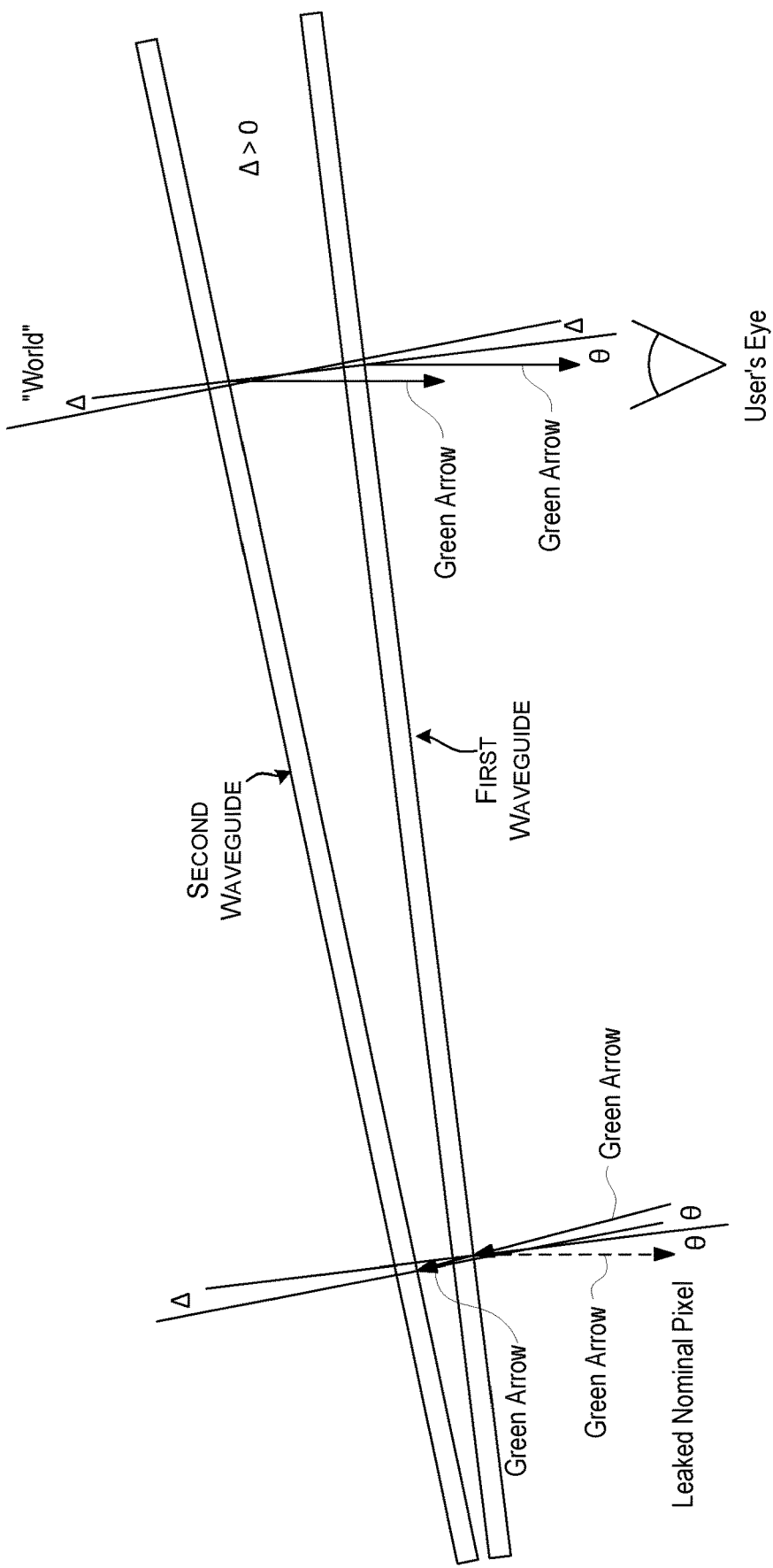
Figure 4D:
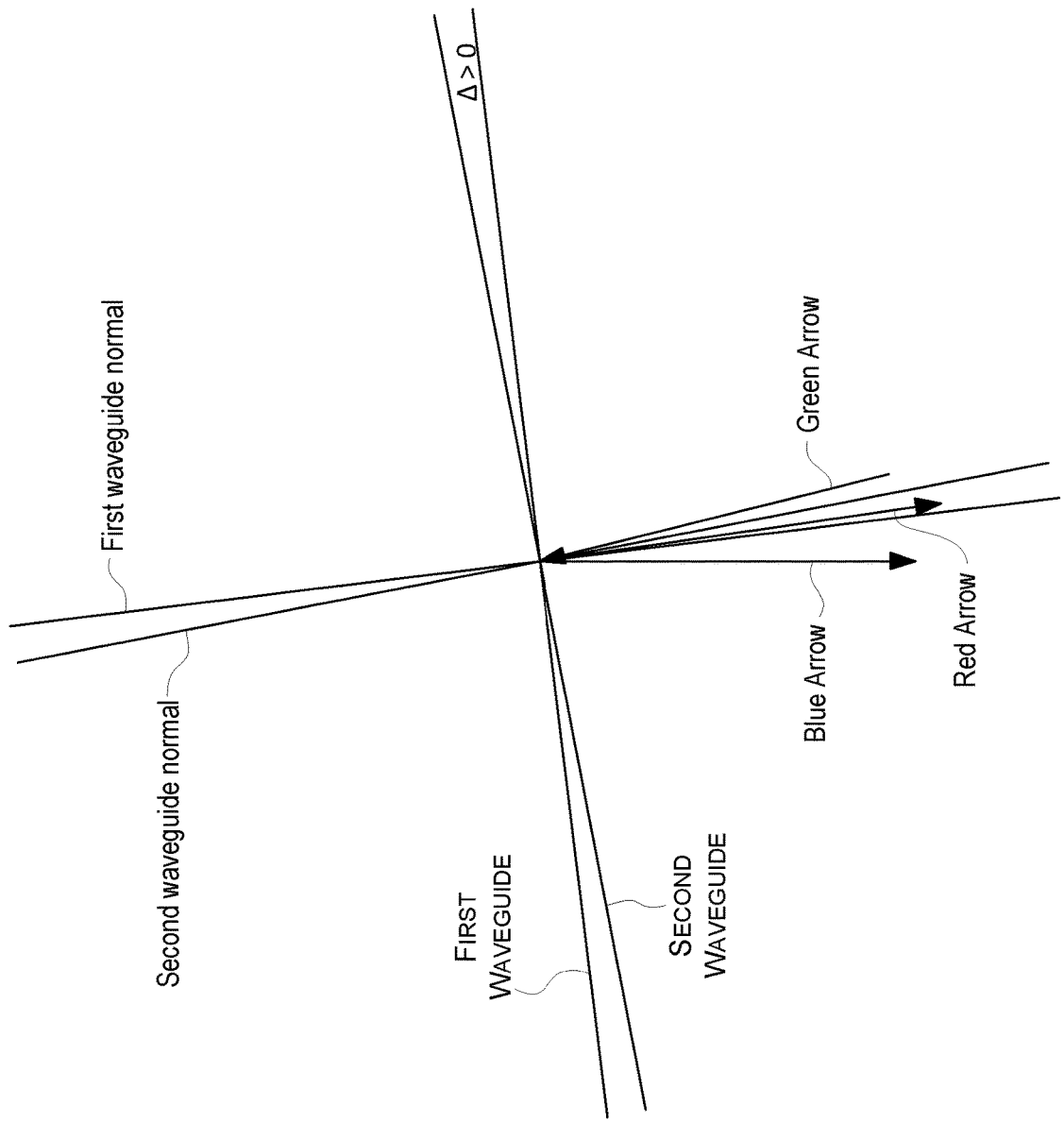

Example calculations for correcting mirror configuration airgap are described below relative to FIGS. 4A-4D. FIG. 4A shows a top view of a waveguide assembly that includes two waveguides (e.g., two plates) without an airgap wedge. FIG. 4B shows a top view of a two plate waveguide assembly that includes two waveguides with an airgap wedge in a periscope configuration. FIG. 4C shows a top view of a waveguide assembly that includes two waveguides with an airgap wedge in a mirror configuration. FIG. 4D shows a graph of surface normals of the two waveguides. In this example, blue light is handled by one waveguide and red light is handled by the other waveguide, and green light is handled by both waveguides.

In the periscope light engine configuration of FIG. 4B, no special actions needed since angle in=angle out (light transmission θin=θout).

In the mirror light engine configuration without grating vector tuning (nominal pixel angles respect to the waveguide plate surface normal):

| Incident angles: | | |
|---|---|---|
| $1^{st}$ plate | $\theta_{in} = \theta$ | (green arrow) |
| $2^{nd}$ plate | $\theta_{in} = \theta - \Delta$ | (green arrow) |
| Reflection angles: | | |
| $1^{st}$ plate | $\theta_{in} = \theta$ | (blue arrow) |
| $2^{nd}$ plate | $\theta_{in} = \theta - \Delta$ | (red arrow) |

In the global coordinates the angle between the nominal pixels, which travel through 2 different non-parallel plates=2 Δ.

Blue and red image components do not create problems, since they travel through different plates and the nominal pixel direction can be adjusted in the light engine by software.

In this two waveguide display, the green image component is the problem since it travels through both plates. Output direction mismatch can be compensated by fine tuning at least one grating vector in one plate. An effective way to accomplish this is to manipulate the outcoupling grating of the "tilted" plate. The previous discussion shows that the second plate output angle should be θ+Δ to match with the plate output angle.

In FIG. 4D, a first line is associated with the first waveguide (e.g., closer to user) and a second line is the second (e.g., distal) waveguide. The dashed lines show the respective surface normals for the first and second waveguides. The green arrow is the nominal pixel entering the waveguides from the light engine in the mirror configuration. The blue and red arrows represent the reflected nominal pixel from the first and second waveguides, respectively.

The discussion below provides example equations to fine tune the tilted waveguide outcoupling grating vector.

For purposes of explanation, the waveguide assembly is tilted or wrapped an angle θ only in horizontal (x) direction and can apply airgap wedge of angle Δ in the same direction by tilting the second waveguide. Therefore, the lateral wave vector components of the incident green nominal pixel can be written as:

$kx0 = kG0 \sin(\theta - \Delta)$, where $kG0 = 2\pi/\lambda G$ is the free-space wave number $ky0 = 0$ To match the first and second plate nominal pixel output directions, the second plate output angle should be θ+Δ, therefore for the output nominal pixel the lateral wave vector components are:

$kx3 = kG0 \sin(\theta + \Delta)$ $ky3 = 0$

The lateral wave vector components of the in-coupled nominal pixel (DOE1 diffraction) takes the form:

$kx1 = kx0 + m1Dx1$ $ky1 = kx0 + m1Dy1$, where the diffraction order (usually 1), Dx and Dy are the grating vector x- and y-components, respectively.

Furthermore, the lateral wavevector components after the DOE2 diffraction:

$kx2 = kx1 + m2Dx2$ $ky2 = kx1 + m2Dy2$.

Analogously after the DOE3 diffraction:

$kx3 = kx2 + m3Dx3$ $ky3 = kx2 + m3Dy3$.

In this example case all gratings are the first order gratings, therefore
m1=m2=m3=1, and this provides the DOE3 grating vector $Dx3=kx3-kx2$ $Dy3=ky3-ky2$.

Original waveguide design gives the DOE1 and DOE2 grating vectors, angles θ and Δ are defined also by design, then it's straightforward to solve the DOE3 grating vector components, which furthermore gives the DOE3 period and orientation:

Orientation=tan−1($Dy3/Dx3$)

Period=2π/sqrt[($Dy3$)2+($Dx3$)2].

This discussion provides a numerical example of the DOE3 orientation and period manipulation. In the ongoing numerical example the waveguide stack second plate grating orientations and periods are:
DOE1:
Orientation=−83.6484°
Period=349.6159 nm
DOE2:
Orientation=−159.6862°
Period=300.2319 nm
Original design DOE3 assuming no airgap wedge:
Orientation=−30.9954°
Period=305.3636 nm
Wrap angle θ=7°
Airgap wedge angle Δ=1 arc min)(1/60°).

With these example values, new DOE3 parameters can be obtained using the equations of the above discussion:

Orientation=−30.9853° (difference to original=0.0101°=36.2 arc sec)

Period=305.2744 nm(difference to original=0.0893 nm).

Of course, other techniques can be employed to calculate the correction and the correction can be applied to other devices having other parameter values than those employed above for purposes of explanation.

Various examples are described above. Additional examples are described below. One example includes a device comprising a display assembly configured to generate light for an image, a first optical waveguide comprising a first transmissive substrate having a first input coupler and a first output coupler positioned thereon, the first optical waveguide positioned to receive the light from the display assembly at the first input coupler and to transmit a first range of wavelengths of the light along the first transmissive substrate, and a second optical waveguide comprising a second transmissive substrate having a second input coupler and a second output coupler positioned thereon, the second optical waveguide positioned in a non-parallel relationship to the first optical waveguide, the second optical waveguide configured to receive a second range of wavelengths of the light through the first optical waveguide at the second input coupler and to emit the second range of wavelengths of the light from the second output coupler toward the first optical waveguide at an angle that causes the first range of wavelengths and the second range of wavelengths to be emitted from the first waveguide at identical angles.

Another example can include any of the above and/or below examples where the second input coupler and the second output coupler comprise diffractive optical elements.

Another example can include any of the above and/or below examples where second output coupler is tuned to output the second range of wavelengths at the angle that compensates for the non-parallel relationship of the first optical waveguide and the second optical waveguide.

Another example can include any of the above and/or below examples where the diffractive optical elements comprise surface relief gratings, binary relief gratings, multilevel relief gratings, volume holograms, resonant waveguide gratings, or partially reflective mirrors.

Another example can include any of the above and/or below examples where the first optical waveguide and the second optical waveguide expand a field of view of the light and/or an exit pupil of the light.

Another example can include any of the above and/or below examples where the second output coupler is tuned by adjusting a sum of the second input coupler and the second output coupler to be non-zero and corresponding to an angle of the non-parallel relationship between the first optical waveguide and the second optical waveguide.

Another example includes a device comprising a first optical waveguide configured to receive light at an incidence angle and a second optical waveguide positioned in a non-parallel relation to the first optical waveguide, the second optical waveguide configured to receive the light through the first optical waveguide at a first location at the incidence angle, transmit the light within the second optical waveguide and output the light from a second location back toward the first optical waveguide at the incidence angle.

Another example can include any of the above and/or below examples where the first optical waveguide is configured to laterally transmit a first wavelength range of the light to the second location and to allow a second wavelength range of the light to reach the second optical waveguide.

Another example can include any of the above and/or below examples where the first optical waveguide is configured to emit the first wavelength range and second wavelength range at the same angle.

Another example can include any of the above and/or below examples where the first wavelength range and the second wavelength range overlap.

Another example can include any of the above and/or below examples where the device further comprises at least a third optical waveguide.

Another example can include any of the above and/or below examples where the third optical waveguide is configured to receive light through the first optical waveguide and the second optical waveguide.

Another example can include any of the above and/or below examples where the third optical waveguide is not parallel to either the first optical waveguide or the second optical waveguide, or wherein the third optical waveguide is parallel to either of the first optical waveguide or the second optical waveguide but not the other of the first optical waveguide or the second optical waveguide.

Another example includes a device comprising a first optical waveguide comprising a first transmissive substrate having a first input coupler and a first output coupler positioned thereon, the first optical waveguide positioned to receive light at the first input coupler and a second optical waveguide comprising a second transmissive substrate having a second input coupler and a second output coupler positioned thereon, the second optical waveguide positioned in a non-parallel relation to the first optical waveguide, the second optical waveguide configured to receive the light from the first optical waveguide at the second input coupler in a first direction and to transmit the light through the second optical waveguide to the second output coupler, the second output coupler tuned to affect the light to cause the light to be output back toward the first optical waveguide in an opposite direction.

Another example can include any of the above and/or below examples where the first input coupler and the first output coupler are positioned on a same surface of the first optical waveguide.

Another example can include any of the above and/or below examples where the second input coupler and the second output coupler are positioned on a same surface of the second optical waveguide.

Another example can include any of the above and/or below examples where the same surface of the second optical waveguide faces the first optical waveguide.

Another example can include any of the above and/or below examples where the first direction is normal to the first optical waveguide but is not normal to the second optical waveguide.

Another example can include any of the above and/or below examples where the opposite direction is normal to the first optical waveguide but is not normal to the second optical waveguide.

Another example can include any of the above and/or below examples where the device further comprises an airgap wedge positioned between the first optical waveguide and the second optical waveguide and that defines an angle defining the non-parallel relation.

CONCLUSION

Although techniques, methods, devices, systems, etc., relating to waveguide tuning are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A device, comprising:
a display assembly configured to generate light for an image;
a first optical waveguide comprising a first transmissive substrate having a first input coupler and a first output coupler positioned thereon, the first optical waveguide positioned to receive the light on a first side from the display assembly at the first input coupler and to transmit a first range of wavelengths of the light along the first transmissive substrate; and,
a second optical waveguide comprising a second transmissive substrate having a second input coupler and a second output coupler positioned thereon, the second optical waveguide positioned in a non-parallel relationship to the first optical waveguide, the second optical waveguide configured to receive a second range of wavelengths of the light through the first optical waveguide at the second input coupler and to emit the second range of wavelengths of the light from the second output coupler toward a second side of the first optical waveguide at an angle that causes the first range of wavelengths and the second range of wavelengths to be emitted from the first side of the first waveguide at identical angles to form an image.

2. The device of claim 1, wherein the second input coupler and the second output coupler comprise diffractive optical elements.

3. The device of claim 2, wherein the second output coupler is tuned to output the second range of wavelengths at the angle that compensates for the non-parallel relationship of the first optical waveguide and the second optical waveguide.

4. The device of claim 3, wherein the diffractive optical elements comprise surface relief gratings, binary relief gratings, multilevel relief gratings, volume holograms, resonant waveguide gratings, or partially reflective mirrors.

5. The device of claim 4, wherein the first optical waveguide and the second optical waveguide expand an exit pupil of the light.

6. The device of claim 5, wherein the second output coupler is tuned by adjusting a sum of the second input coupler and the second output coupler to be non-zero and corresponding to an angle of the non-parallel relationship between the first optical waveguide and the second optical waveguide.

7. A device, comprising:
a first optical waveguide configured to receive light at an incidence angle; and,
a second optical waveguide positioned in a non-parallel relation to the first optical waveguide, the second optical waveguide configured to receive the light through the first optical waveguide at a first location at the incidence angle, transmit the light within the second optical waveguide and output the light from a second location back toward the first optical waveguide at the incidence angle.

8. The device of claim 7, wherein the first optical waveguide is configured to laterally transmit a first wavelength range of the light to the second location and to allow a second wavelength range of the light to reach the second optical waveguide.

9. The device of claim 8, wherein the first optical waveguide is configured to emit the first wavelength range and second wavelength range at the same angle.

10. The device of claim 9, wherein the first wavelength range and the second wavelength range overlap.

11. The device of claim 7, further comprising at least a third optical waveguide.

12. The device of claim 11, wherein the third optical waveguide is configured to receive light through the first optical waveguide and the second optical waveguide.

13. The device of claim 12, wherein the third optical waveguide is not parallel to either the first optical waveguide or the second optical waveguide, or wherein the third optical waveguide is parallel to either of the first optical waveguide or the second optical waveguide but not the other of the first optical waveguide or the second optical waveguide.

14. A device, comprising:
a first optical waveguide comprising a first transmissive substrate having a first input coupler and a first output coupler positioned thereon, the first optical waveguide positioned to receive light at the first input coupler; and,
a second optical waveguide comprising a second transmissive substrate having a second input coupler and a second output coupler positioned thereon, the second optical waveguide positioned in a non-parallel relation to the first optical waveguide, the second optical waveguide configured to receive the light from the first optical waveguide at the second input coupler in a first direction and to transmit the light through the second optical waveguide to the second output coupler, the second output coupler tuned to affect the light to cause the light to be output back toward the first optical waveguide in an opposite direction.

15. The device of claim 14, wherein the first input coupler and the first output coupler are positioned on a same surface of the first optical waveguide.

16. The device of claim 14, wherein the second input coupler and the second output coupler are positioned on a same surface of the second optical waveguide.

17. The device of claim 16, wherein the same surface of the second optical waveguide faces the first optical waveguide.

18. The device of claim 14, wherein the first direction is normal to the first optical waveguide but is not normal to the second optical waveguide.

19. The device of claim 14, wherein the opposite direction is normal to the first optical waveguide but is not normal to the second optical waveguide.

20. The device of claim 14, further comprising an airgap wedge positioned between the first optical waveguide and the second optical waveguide and that defines an angle defining the non-parallel relation.

* * * * *